J. P. CROWLEY.
METHOD AND APPARATUS FOR DRAWING SHEET GLASS.
APPLICATION FILED AUG. 7, 1920.
1,435,956
Patented Nov. 21, 1922.
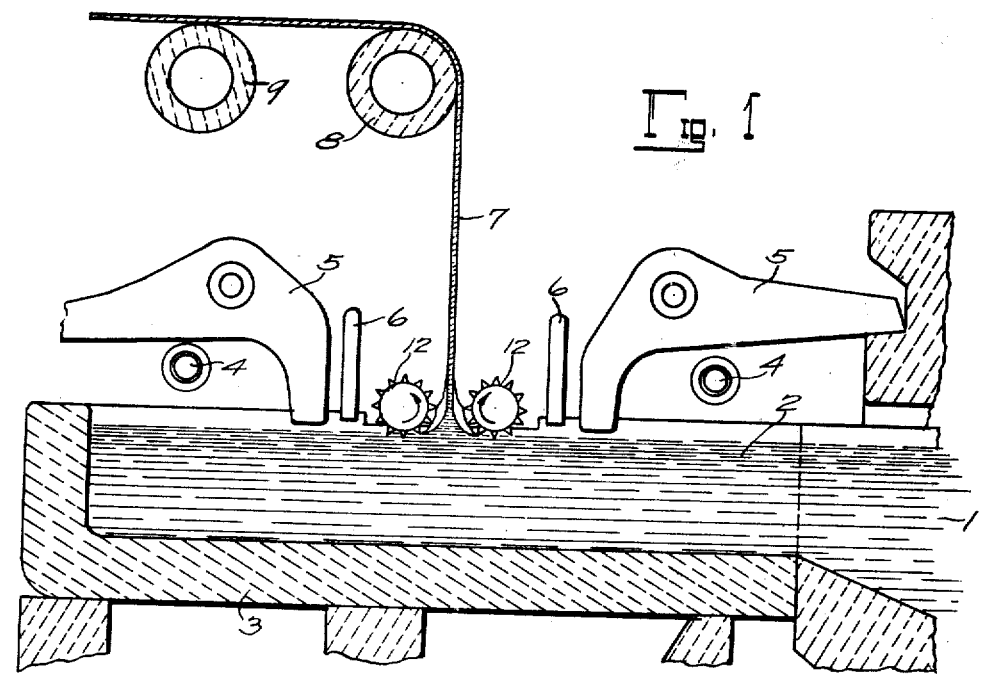
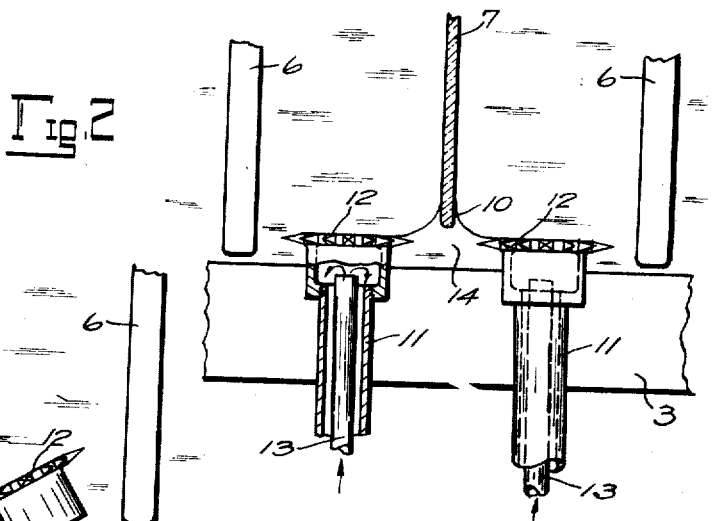
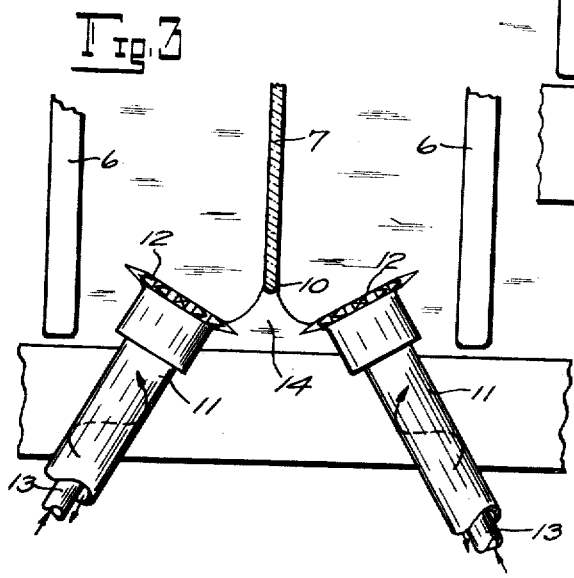
INVENTOR
JOSEPH P. CROWLEY
BY C. H. Rowley
HIS ATTORNEY

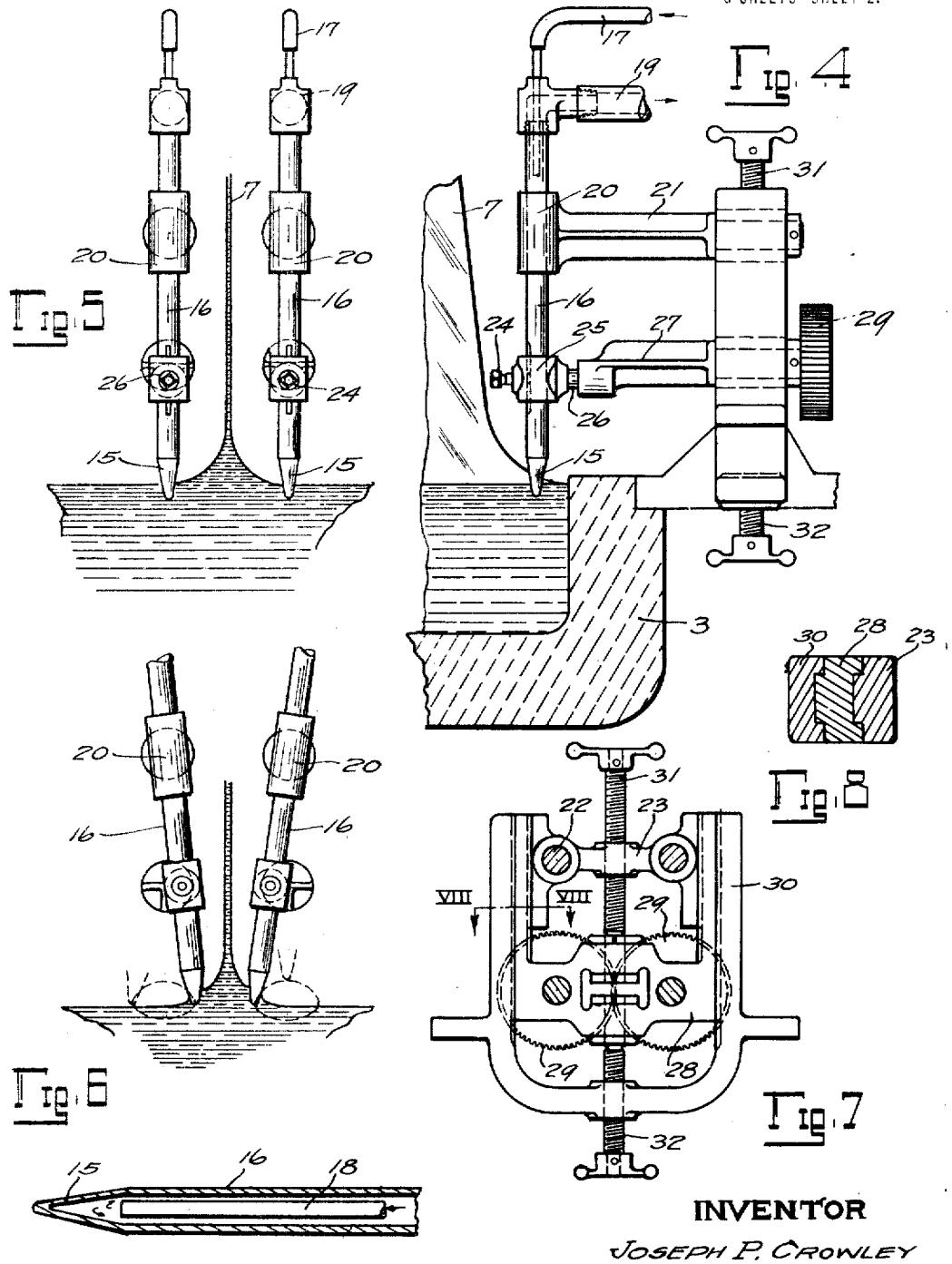

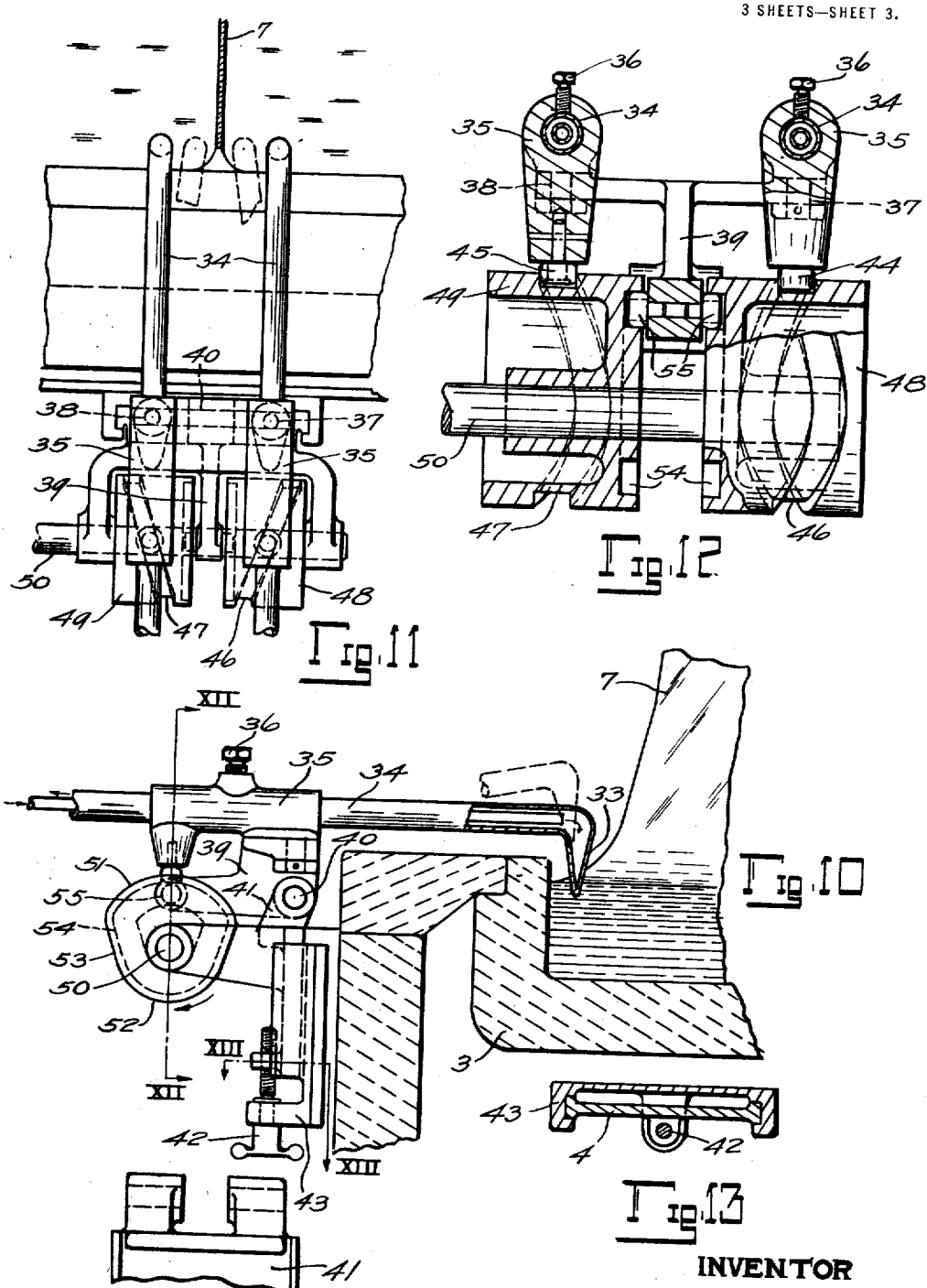

Patented Nov. 21, 1922.

1,435,956

UNITED STATES PATENT OFFICE.

JOSEPH P. CROWLEY, OF TOLEDO, OHIO, ASSIGNOR TO THE LIBBEY-OWENS SHEET GLASS COMPANY, OF TOLEDO, OHIO, A CORPORATION OF OHIO.

METHOD AND APPARATUS FOR DRAWING SHEET GLASS.

Application filed August 7, 1920. Serial No. 401,839.

*To all whom it may concern:*

Be it known that I, JOSEPH P. CROWLEY, a citizen of the United States, residing at Toledo, in the county of Lucas and State of Ohio, have invented new and useful Improvements in Methods and Apparatus for Drawing Sheet Glass, of which the following is a specification.

This invention relates to the art of drawing sheet glass, and, more specifically, to a method and apparatus for facilitating the flow of the molten glass into the sheet and providing a continuous supply of cool stiff glass for the sheet edges, whereby the sheet will pull smoothly and evenly and maintain its width.

When sheet glass is drawn upwardly from a pot or receptacle, containing molten glass, the glass at the sides, from which the edges of the sheet are formed, is cooler and less plastic than the glass at the center from which the main body of the sheet is formed. This is due primarily to the proximity of this glass to the sides of the receptacle, and is also often accentuated by artificial cooling means, it being desirable to have the edge portions of the sheet cooler and stiffer to maintain the width of the sheet. This cooler and less plastic glass will, of course, flow less readily into the sheet and it is customary to employ some auxiliary drawing means to assist in pulling up this stiffer glass, as for example the edge rollers shown in the patent to Colburn, Reissue 14,794, Jan. 27, 1920.

It is an object of this invention to force this cooler glass at the sides to flow toward and into the forming sheet, so as to provide a constant supply of cool glass at the sheet edge sources, and in practicing the invention a plurality of teeth or pickers, moving in closed paths or orbits above the surface of the molten mass, dig into the cooled surface of the glass mass and tend to carry it toward, and upwardly into, the sheet. These teeth or pickers are cooled, to prevent the hot glass from adhering thereto, and the contact with, and proximity of, these cooled members to the molten glass at the sides of the receptacle tends to further cool and stiffen the glass thus forming the desired stiff edge portions on the drawn sheet.

Molten glass, if allowed to cool slowly, without being kept in motion, tends to devitrify or form so-called "dog metal", and this trouble has often been experienced at the sides of the receptacle from which the edge portions of the sheet are drawn. A further object of this invention is to prevent this devitrification, by keeping the glass in motion at the sides of the receptacle. By stirring up and preventing the premature setting of the surface portion of the molten glass, this invention also tends to eliminate the formation of waves or undulations which often injure the quality of drawn sheet glass.

Further objects and advantages of this invention will appear as the description proceeds.

In the accompanying drawings, showing three practical embodiments of the invention:

Fig. 1 is a central vertical section through the sheet and that end of the apparatus from which the sheet is drawn.

Fig. 2 is a partial plan view of one pair of the molten glass manipulating devices for carrying out this invention, the sheet being shown in transverse section.

Fig. 3 is a view similar to Fig. 2 with the teeth or pickers arranged at a different angle to the plane of the sheet.

Fig. 4 is a side elevation of a modified form of the invention, one edge only of the sheet being shown in side elevation, and the drawing receptacle shown in vertical section.

Fig. 5 is a partial inner end elevation of the glass pickers, and

Fig. 6 is a similar view showing the pickers in a different working position.

Fig. 7 is an outer end elevation of the supporting and adjusting frame for the pickers, and Fig. 8 is a cross-section on the line 8—8 of Fig. 7.

Fig. 9 is a cross-section of one of the pickers showing the water-cooling system.

Fig. 10 is a side elevation, similar to Fig. 4, showing a third modification of the invention.

Fig. 11 is a plan view of one pair of the pickers, and their operating mechanism according to this form of the invention.

Fig. 12 is an enlarged elevation, partly in section on the line 12—12 of Fig. 10 of the cam mechanism for operating the pickers.

Fig. 13 is a transverse section of the supporting bracket and slide plate on the line 13—13 of Fig. 10.

Fig. 14 is a partial elevation of the upper end of the supporting slide-plate.

Referring first to Figs. 1, 2 and 3 of the drawings, which illustrate the preferred form of apparatus for carrying out my invention, 1 is the end of the cooling tank from which the refined molten glass 2 flows into the drawing receptacle 3. The apparatus so far described, as well as all of the system for melting, refining and preparing the glass for the drawing operation, may be of any well-known form such for example as that shown in the patent to Colburn, 1,248,809, granted Dec. 4, 1917. The molten glass in the drawing receptacle is retained at the proper temperature by the burners 4, under the shielding lip-tiles 5, and the glass at the drawing point, which is exposed to the atmosphere, is tempered by the water-coolers 6. The glass sheet 7 is drawn up from this cooled surface, passed over the cooled bending-roll 8, and intermediate supporting roll 9, and drawn off in a horizontal direction by suitable drawing and flattening devices into the annealing leer. All of this is common practice in this art, as shown for example in the Colburn patent above referred to. It is understood that other sheet enclosing, heating and cooling devices than those shown, are employed at different stages of the sheet forming process, but as these features may be of old and well-known form they will not be further described.

The glass at the sides of the receptacle, from which the edge portions 10 of the sheet are drawn, is cooler and less plastic than the glass at the central portions of the receptacle. This is due in part to the relative proximity of this glass to the cool sides of the pot or receptacle, and in part to the presence of the water-cooled glass-feeding devices now about to be described. Mounted above, and substantially parallel to the surface of the molten mass, at each side of each edge of the sheet 7, is a hollow rotary shaft 11, each being rotated in the direction of the arrows shown on the drawings, by any suitable driving means. At the inner end of each shaft is mounted a circular series of teeth or pickers 12, somewhat resembling a sprocket-wheel in appearance. The shafts and pickers are internally cooled by a constant flow of water, which passes in through an inner pipe 13, and out around this pipe through the hollow shaft 11. While in the lower portion of their orbit, the teeth 12, dig into the surface portion of the glass mass, cooling the same and tending to set up a flow of the glass inward toward the sheet. As the teeth rise on the inner portion of their orbit they tend to carry the glass upward into the sheet, and the combined action of the two sets of teeth or pickers is to keep up a constant flow of cooled, stiff, glass, into the edges of the sheet, and to build up a reserve mass of glass at 14 for readily feeding into the sheet edges. An ample supply of cool glass is thus maintained at the sources of the sheet edges, and this glass is much cooler and stiffer than the glass at the central portion of the receptacle. A much greater tension or pulling strain is necessary to pull the sheet edge portions from this less plastic glass, and this added tension at the edges tends to maintain the width of the sheet and overcome the tendency to narrow that is present in all sheet drawing operations.

By keeping the glass in motion along the sides of the receptacle the cooling glass is prevented from devitrifying and forming "dog metal."

The shafts may be arranged parallel to the sheet faces, so that the paths or orbits of the teeth are at right angles to the sheet, and the flow of glass will be at right angles to the sheet, as shown in Fig. 2; or the shafts may be arranged at any desired angle to the sheet faces, as shown for example in Fig. 3, so that the flow of glass will be outward, toward the receptacle walls, thus adding a certain lateral stretch to the sheet. Any desired number of teeth 12 may be used on each shaft, and the speed of rotation of the shafts is capable of adjustment so as to maintain the proper flow of glass to the sheet edge sources.

It will be noted that in this, and both succeeding forms of the apparatus used, there is no contact at any point between the teeth or pickers and the formed sheet so that the edge will draw smooth and unmarred.

In the modification shown in Figs. 4 to 9 inclusive, a pair of teeth or pickers 15, at the lower ends of vertically extending levers 16, are positioned, one at each side of each edge of the sheet 7, as shown in Figs. 4 and 5. These levers 16 are in the form of hollow tubes or pipes and are internally water-cooled, as in the form of the invention first described. The water flows in through pipe 17, and inner pipe 18 to and through the picker 15, then out through the hollow lever 16 and pipe connection 19, as all shown more particularly in Figs. 4 and 9.

The members 16 are vertically slidable through tubular guides 20 at the ends of rock-shafts 21, pivoted at 22 in the slidable frame 23. Near their lower ends, the members 16 are secured, by means of adjusting screws 24, in sleeve members 25, eccentrically pivoted at 26, in the ends of rotatable shafts 27. These shafts 27 are rotatably mounted in slidable frame 28, and are geared together by gears 29, to rotate simultaneously in opposite directions. These shafts are driven by any suitable means such that their speed can be varied as found desirable. The frame 23 is slidably mounted in upright extensions on frame 28, which in turn are slidably mounted in a fixed frame member 30, all as clearly shown in Figs. 7 and 8. The frames 23 and 28 are adjustable vertically, relative to frame 30 and to each other by means of the adjusting screws 31 and 32 respectively. By proper manipulation of these adjusting devices the position of the pickers 15 relative to the surface of the molten glass and the size of the orbits described by these pickers can be adjusted as desired. The paths followed by these pickers 15 when in operation are shown in dotted lines in Fig. 6.

In the modification shown in Figs. 10 to 14 inclusive the pickers 33 are formed as vertical downward extensions of horizontal shafts 34, adjustably secured in sleeve members 35 by screws 36. The pickers 33 and shafts 34 are internally water-cooled in the same manner as already described in connection with Figs. 4 to 9. The two sleeve members 35 are pivoted on vertical axes 37 and 38, respectively, on a bell-crank lever 39, horizontally pivoted at 40, on an upright slide plate 41. This plate 41, is adjustable vertically, by means of adjusting screw 42 in the supporting bracket 43, which has vertical guide slots in which the plate is mounted. By proper manipulation of the adjusting screws 36 and 42, the positions of the pickers with relation to the surface of the molten mass and the edge of the sheet can be varied as found to be desirable. At the lower outer ends of sleeves 25 are vertically pivoted rollers 44 and 45 which operate in cam slots 46 and 47 respectively, in cam members 48 and 49 secured to the constantly rotating horizontal shaft 50. The cam slots 46 and 47 have their corresponding portions oppositely inclined, as shown in Figs. 11 and 12, so that rotation of the cams 48 and 49 will cause the sleeves 35 and hence the shafts 34 and pickers 33 to oscillate to and from each other, and the sheet 7. The peripheries of the cams 48 and 49 are eccentric to the shaft 50, each having high concentric portions 51, low concentric portions 52, and intermediate connecting inclined portions 53, as shown in Fig. 11. On the inner adjacent ends of the cam members are cam slots 54, each following the contour of the peripheries of the cam members. Guided in these cam slots 54 are rollers 55 pivoted at the outer end of bell-crank 39. The effect of these slots 54 is to oscillate the bell-crank, and hence the pickers 33 in a vertical plane. The elevated position of one of the pickers is shown in dotted lines in Fig. 11. The combined effect of the two sets of cam slots 46 and 47, and 54 is to cause each of the pickers to follow an elliptical path dipping into the glass bath in the lower portions of their orbits and carrying the cooled glass inwardly toward the sheet.

In each form of the invention shown, the effect of the moving teeth or pickers is to dip into and cool the glass and simultaneously set up a circulation of the cooled glass at the sides of the receptacle inwardly toward the forming edges of the sheet, thus overcoming the tendency of the glass at the sides to devitrify, and also maintaining a constantly replenished supply of cool stiff glass at the sources from which the sheet edges are drawn.

Obviously many other forms of the operating mechanism for carrying out this invention could be devised without departing from the scope of the invention as outlined in the following claims.

Claims:

1. The method of drawing sheet glass, which consists in preparing a mass of molten glass, chilling the surface portions of the molten mass from which the edge portions of the sheet are drawn, and simultaneously positively moving these chilled portions toward and upwardly into the forming sheet, and drawing the glass sheet upwardly from these edge sources and the intermediate molten glass.

2. The method of continuously drawing sheet glass, which consists in preparing a mass of molten glass, chilling those portions of the surface of the molten mass from which the edge portions of the sheet are drawn, and simultaneously mechanically propelling these chilled portions upwardly into the sheet, and drawing a sheet of glass upwardly from these edge sources and the intermediate molten glass.

3. The method of drawing sheet glass, which consists in preparing a mass of molten glass wherein the portions from which the edges of the sheet are formed are cooler than the intermediate portion, drawing upwardly a sheet of glass, and mechanically assisting the cooler and less plastic surface portions at the edges to flow into the edges of the sheet, the entire width of the drawn sheet being out of contact with any forming means.

4. The method of drawing sheet glass, which consists in preparing a mass of molten glass wherein the portions from which the edges of the sheet are formed are cooler than the intermediate portion, drawing a sheet of glass from the molten mass, and positively enforcing a flow of the cooler and less plastic glass at the sheet edge sources into the edges of the sheet to supplement and assist the drawing action, and maintaining the entire width of the drawn sheet free from contact with the flow enforcing means.

5. In a sheet glass drawing apparatus, a receptacle containing a mass of molten glass, means for drawing a sheet of glass therefrom, and with maintaining means for cooling and positively moving those portions of the molten mass from which the edges of the sheet are drawn outwardly and upwardly into the forming sheet, without contacting with or marring the sheet.

6. In a sheet glass drawing apparatus, a receptacle containing molten glass, means for drawing a sheet of glass upwardly therefrom, and a plurality of teeth or pickers for causing those portions of the molten mass from which the edges of the sheet are drawn to flow into the edges of the sheet, the teeth not contacting with the drawn sheet.

7. In a sheet glass drawing mechanism, a receptacle containing molten glass, means for drawing a sheet of glass upwardly therefrom, and a plurality of water-cooled moving teeth or pickers for continuously chilling the surface portions of the molten mass from which the edges of the sheet are drawn, and forcing these chilled portions to move upwardly and outwardly into the edges of the sheet, the teeth remaining out of contact with the drawn sheet.

8. In a sheet glass drawing mechanism, a receptacle containing molten glass, means for drawing a sheet of glass upwardly therefrom, and water-cooled moving teeth or pickers for chilling the surface portions of the molten mass from which the edges of the sheet are drawn, and forcing these chilled portions to move upwardly into the edges of the sheet, the teeth remaining out of contact with the drawn sheet.

9. In a sheet glass drawing apparatus, a receptacle containing molten glass, means for drawing a sheet of glass upwardly therefrom, and internally-cooled moving teeth or pickers for chilling the surface portions of the molten mass from which the edge portions of the sheet are drawn, and forcing these chilled portions to move into the edges of the sheet, the teeth remaining out of contact with the drawn sheet.

10. In a sheet glass drawing apparatus, a receptacle containing molten glass, means for drawing a sheet of glass upwardly therefrom, pairs of continuously rotating shafts located above the surface of the molten mass at each edge of the sheet, the sheet passing between the ends of each pair of shafts, and a circular series of teeth or pickers carried by each shaft, and moving into and with the surface portion of the glass toward the forming sheet, and means for internally cooling the pickers, whereby the surface of the molten mass at the edges of the sheet is chilled and carried into the sheet, the pickers remaining out of contact with the drawn sheet.

11. In a sheet glass drawing apparatus, a receptacle containing molten glass, means for drawing a sheet of glass upwardly therefrom, pairs of continuously rotating shafts located above the surface of the molten mass at the edges of the sheet, the sheet passing between the ends of each pair of shafts, and a circular series of teeth or pickers carried by each shaft, and moving into and with the surface portion of the glass toward the forming sheet for assisting the edge portions of the molten mass to flow into the sheet, the pickers remaining out of contact with the drawn sheet.

Signed at Toledo, in the county of Lucas and State of Ohio, this 5th day of August, 1920.

JOSEPH P. CROWLEY.

Certificate of Correction.

It is hereby certified that in Letters Patent No. 1,435,956, granted November 21, 1922, upon the application of Joseph P. Crowley, of Toledo, Ohio, for an improvement in "Methods and Apparatus for Drawing Sheet Glass," an error appears in the printed specification requiring correction as follows: Page 4, line 1, claim 5, for the word "with" read *width;* and that the said Letters Patent should be read with this correction therein that the same may conform to the record of the case in the Patent Office.

Signed and sealed this 6th day of February, A. D., 1923.,

[SEAL.]
KARL FENNING,

*Acting Commissioner of Patents.*